United States Patent
Leipelt et al.

(10) Patent No.: US 6,408,810 B1
(45) Date of Patent: Jun. 25, 2002

(54) AIR INTAKE DEVICE

(75) Inventors: Rudolf Leipelt, Hessigheim; Olaf Weber, Friolzheim, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/693,907

(22) Filed: Oct. 23, 2000

(30) Foreign Application Priority Data

Oct. 23, 1999 (DE) .......................................... 199 51 083

(51) Int. Cl.$^7$ ............................................... F02M 35/10
(52) U.S. Cl. .................................................. 123/184.55
(58) Field of Search ................................ 123/184.55

(56) References Cited

U.S. PATENT DOCUMENTS 5,740,770 A * 4/1998 Morota .................. 123/184.55

FOREIGN PATENT DOCUMENTS

| DE | 36 30 488  | 3/1987  |
|----|------------|---------|
| DE | 38 07 159  | 9/1989  |
| DE | 197 17 272 | 11/1997 |
| DE | 197 28 600 | 1/1999  |
| DE | 198 41 810 | 3/2000  |

* cited by examiner

*Primary Examiner*—Noah P. Kamen
(74) *Attorney, Agent, or Firm*—Crowell & Moring LLP

(57) ABSTRACT

An air intake device for an internal combustion engine which includes at least one collection manifold and intake ducts branching off separately to individual cylinders of the internal combustion engine. The intake lines extend to the collection manifold and are formed at least partially of a flexible tube, especially a rubber tube. The intake lines furthermore have stiff or variable-length portions which are divided into at least two segments disposed for movement independently of one another.

10 Claims, 7 Drawing Sheets

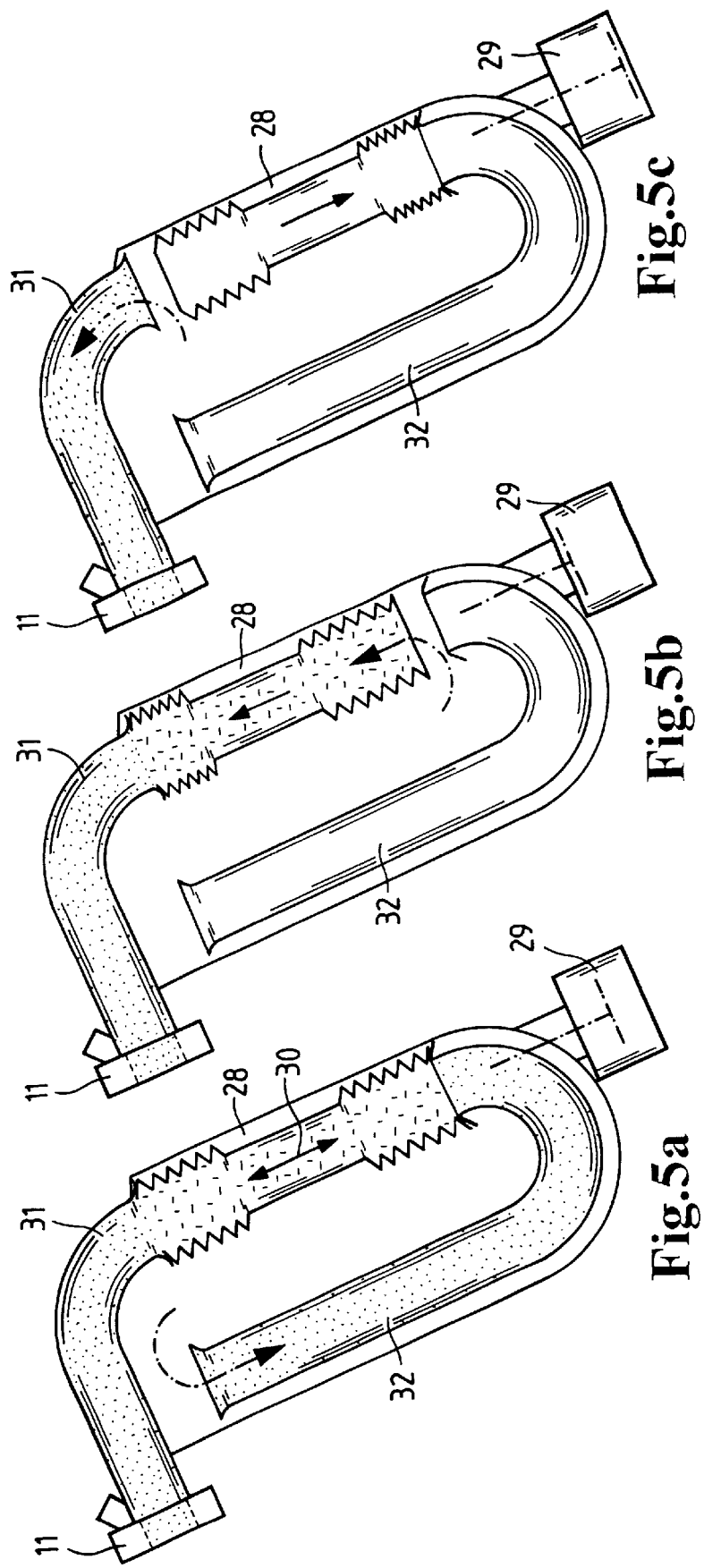

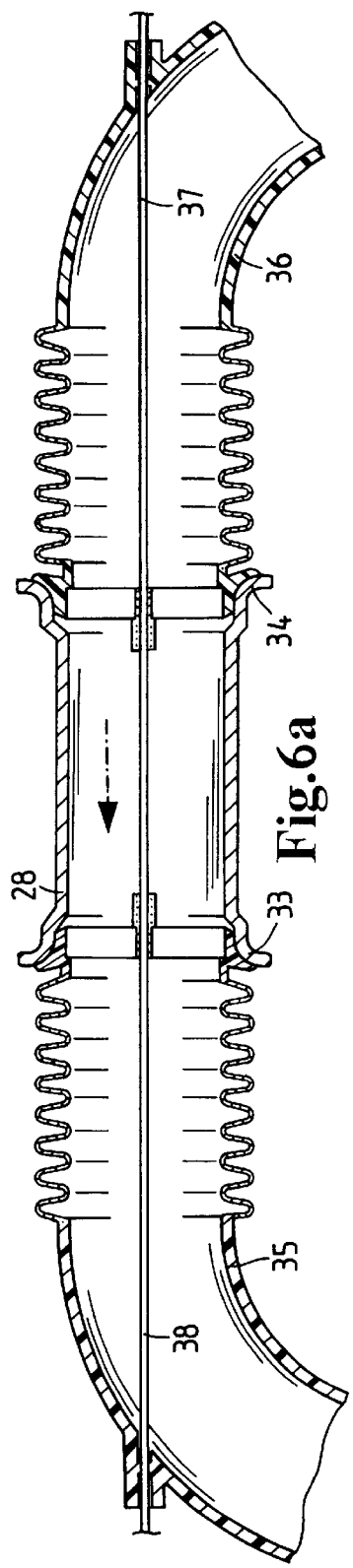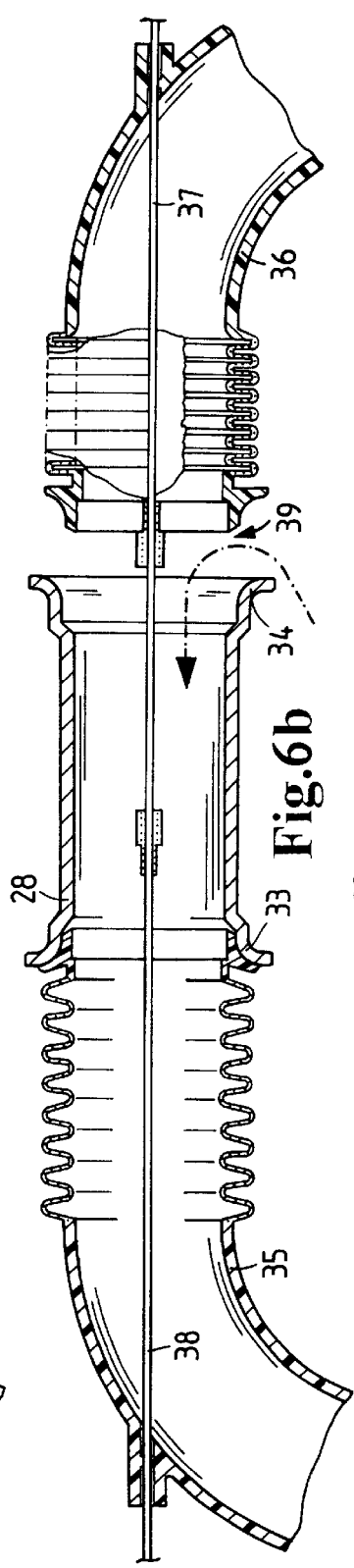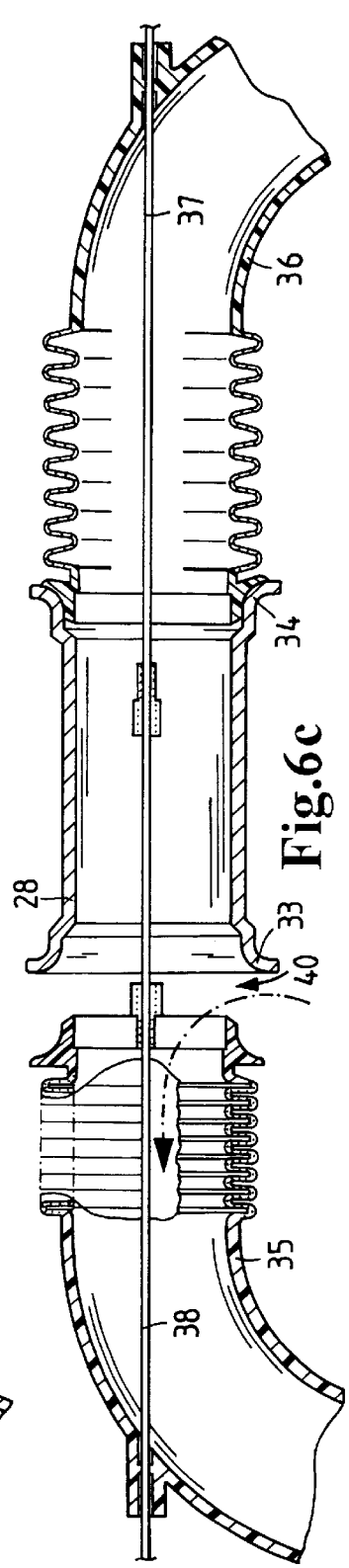

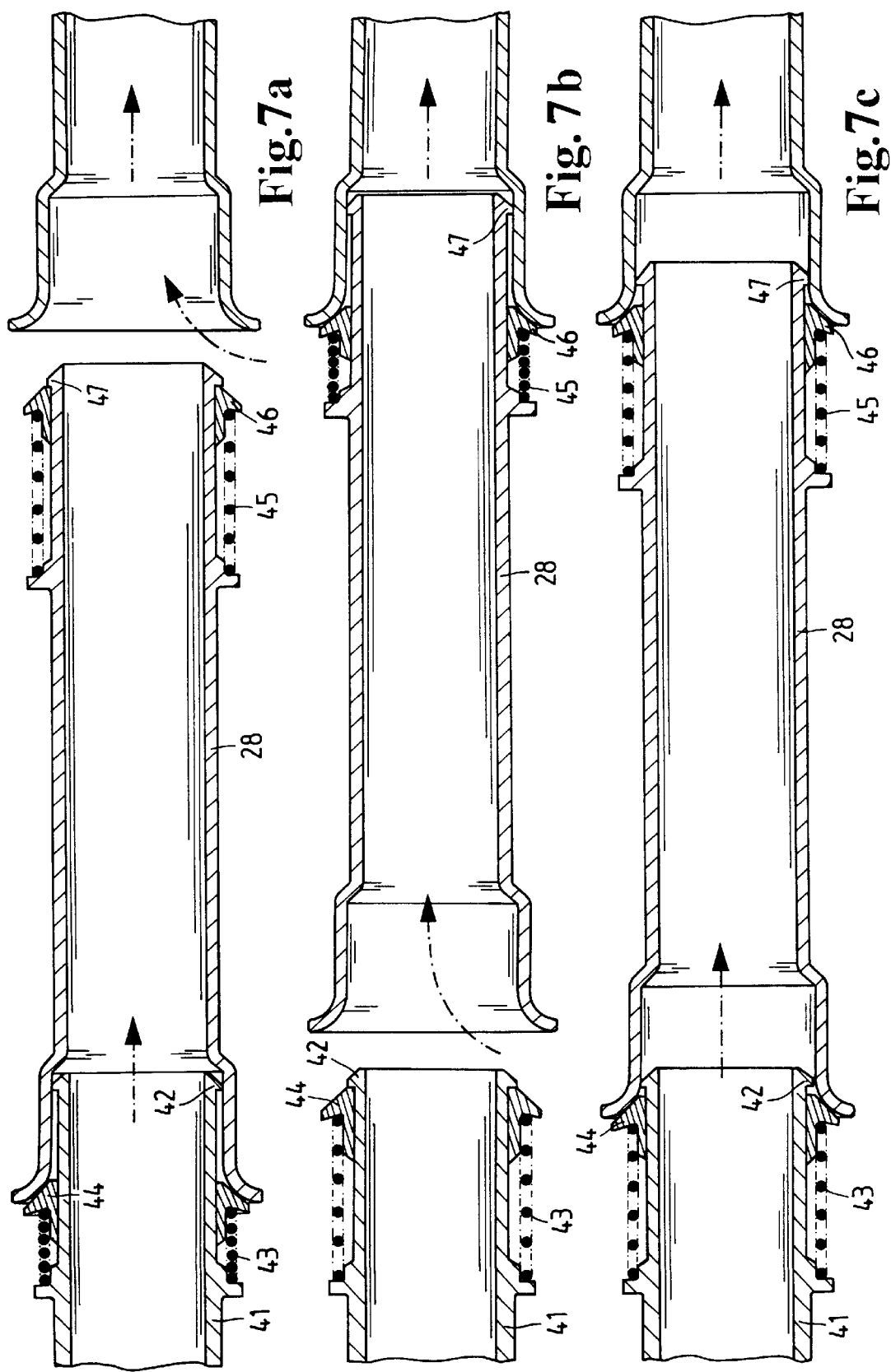

AIR INTAKE DEVICE

BACKGROUND OF THE INVENTION

This invention relates to an air intake device for internal combustion engines with at least one collection manifold and intake tubes branching separately to the individual cylinders of the internal combustion engine, in which the intake tubes extend to the collection manifold and are formed at least partially by a flexible element.

Published German Patent Application No. DE 197 17 272 discloses an air intake apparatus for an internal combustion engine, which has an air collection manifold and individual air channels to the individual cylinders. Adjustable intake tube extensions are associated with the air channels. These air channel extensions comprise setting devices with rocker systems and pantograph-like levers. A disadvantage of this construction lies in the complicated drive mechanism of the intake tube extensions. Especially in internal combustion engines which are used in motor vehicles, there is a danger that these mechanical components may become impaired by environmental influences. Any failure of the mechanisms inevitably leads to a loss of power.

Air intake devices for internal combustion engines are also known which have intake lines made of a flexible tubing. This flexible tubing is contained within a closed system, but a disadvantage of this construction is that the walls of the tubing are ribbed for flexibility, and this needlessly increases resistance to air flow.

SUMMARY OF THE INVENTION

It is an object of the invention to provide an air intake system which avoids the aforementioned disadvantages.

Another object of the invention is to provide an air intake device which will have a positive influence on the power of an internal combustion engine with which it is used.

A further object of the invention is to provide an air intake device which will have a simple and reliable construction.

It is also an object of the invention to provide an air intake device which will not substantially increase resistance to flow.

These and other objects have been achieved in accordance with the present invention by providing an air intake device for an internal combustion engine, said device comprising at least one collection manifold and a plurality of intake tubes which branch separately from the collection manifold to individual cylinders of the internal combustion engine, wherein each of the intake tubes extends to the collection manifold and is formed at least partially by a flexible element, and said intake tubes comprise stiff or variable-length portions, which portions are divided into at least two segments mounted so as to be moveable independently of one another.

A significant advantage of the invention is that the intake tubes comprise different regions or segments, and it is possible to couple and decouple the various segments.

In accordance with one embodiment of the invention, the various segments are journaled on a common pivot center. This eliminates complicated linkages or drive systems. The common center permits the necessary adjusting movements to be carried out in a simple manner.

In another embodiment of the invention the segments are longitudinally displaceable. This is especially practical where the segments consist of short pieces of tubing. Of course, it is also possible to combine longitudinally displaceable segments with rotary segments in order to make optimal use of available space.

In a further embodiment the segments are provided with radial and/or axial gaskets at their coupling points. These gaskets assure optimum coupling and prevent the entry of extraneous air.

Another embodiment of the invention describes the overall structure of an air intake device in which rigid first element is coupled to a rotatable or longitudinally moveable second element, which in turn can be coupled to a rigid third element. The longitudinally movable element is equipped at the coupling points with sections of variable length.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIGS. 5a–c show an air intake device with an intermediate element which is displaceable lengthwise;

FIGS. 6a–c show a detail of a longitudinally displaceable intermediate element; and FIGS. 7a–c show a system with an axially movable intermediate element.

DETAILED DESCRIPTION OF PREFERRED EMBODIMENTS

Figure 1A:
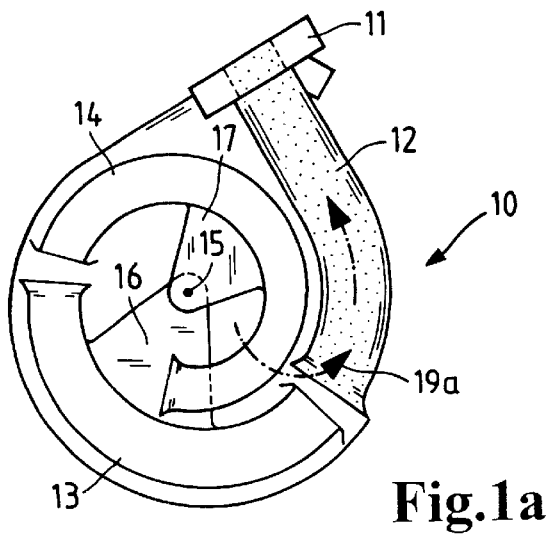
FIGS. 1a–c show an air intake device with two movable segments.

The air intake device comprises a housing 10 which is provided with a flange 11 to fasten the housing to an internal combustion engine, not shown here. Beginning from the flange 11 a fixed intake tube 12 is arranged in the housing 10. This intake tube is adjoined by two moving intake tube segments 13 and 14. These intake tube segments are journaled at a common pivot point 15. The mounting of the intake tube segments 13 and 14 is in the form of a suitable supporting structure 16, 17. In the position shown in FIG. 1a, the intake tube segments 13 and 14 are spaced apart, i.e., the intake air for the internal combustion engine flows directly according to the arrow 19a into the intake tube 12 and from there to the internal combustion engine. This position is the so-called power position and achieves a high torque at high speeds of the internal combustion engine.

Figure 1B:
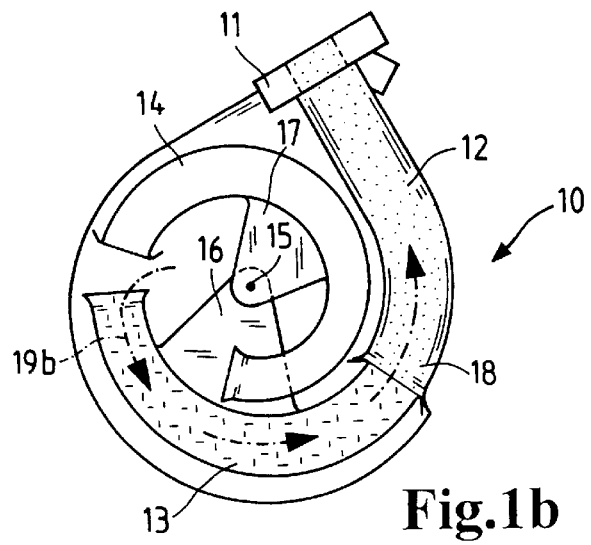

FIG. 1b shows the air intake device in which the intake tube segment 13 is coupled to the intake tube 12. For this purpose the corresponding coupling gaskets 18 are provided. The air now flows according to arrow 19b through the intake tube segment 13 and intake tube 12 into the internal combustion engine. This position provides for optimum torque, especially at low engine speeds.

Figure 1C:
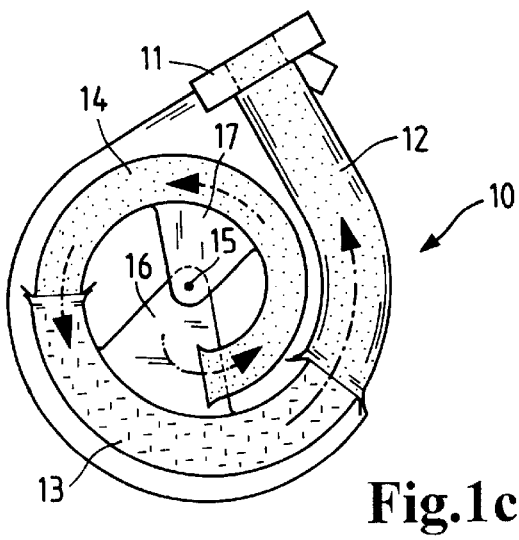

FIG. 1c shows the coupling of intake tube segment 14 to segment 13 and intake tube 12. The air now flows over the longest path into the internal combustion engine. Appropriate gaskets may be provided between the individual segments provide for a reliable seal.

Figure 2A:
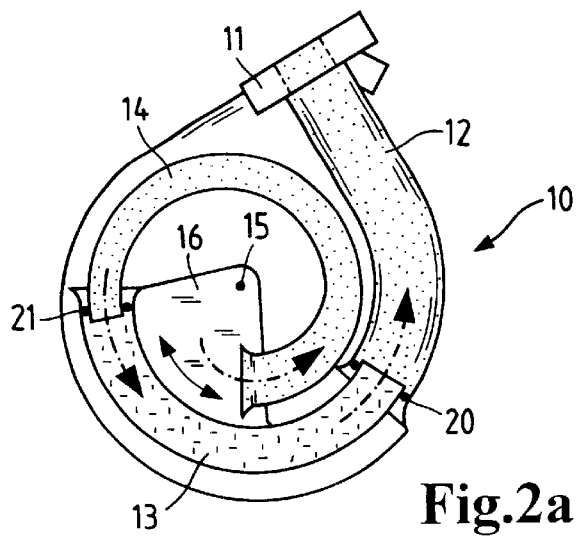
FIGS. 2a–c show a first variant of the air intake device with a moveable intermediate segment.
Figure 2B:
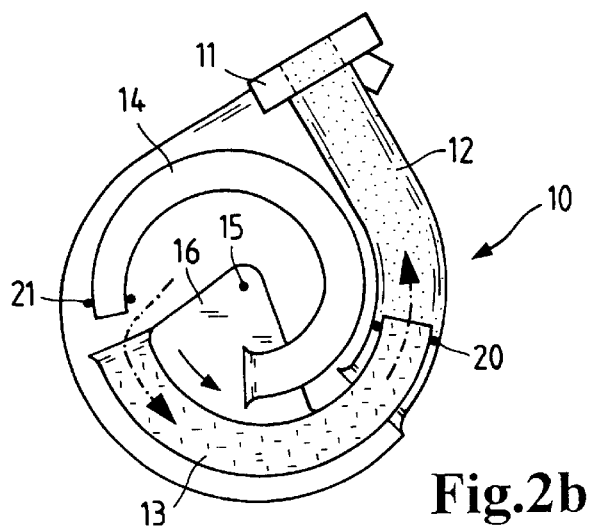
Figure 2C:
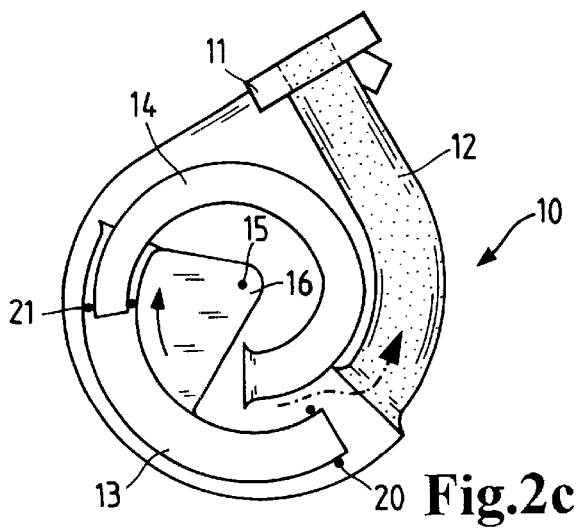

FIGS. 2a through 2c show a first variant of the air intake device. Between the individual segments 13 and 14 and the intake tube 12, variable length gaskets 20 and 21 are provided. In the position shown in FIG. 2a, the air intake device forms the longest intake path. FIG. 2b shows the uncoupling of segment 14. At the same time segment 13 enters partially into intake tube 12. In FIG. 2c the segment 13 is swung away from intake tube 12. The intake air flows directly into intake tube 12. The advantage of the construction shown in FIG. 2 is that the segment 14 is itself fixedly arranged in the housing. only segment 13 is pivotally mounted. The turning of segment 13 is permitted by the axially displaceable gaskets 20 and 21, which simultaneously serve as mountings to support the ends of the segments inserted in the adjacent segments.

Figure 3A:
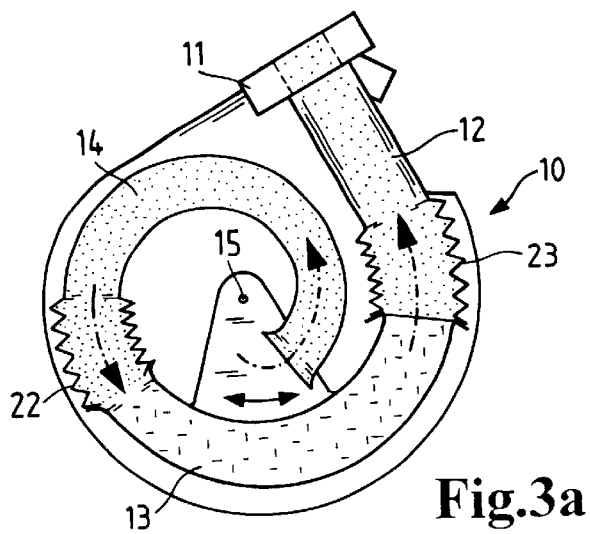
FIGS. 3a–c show another variant of an air intake device with compressible portions at the coupling ends of first and third tube segments.
Figure 3B:
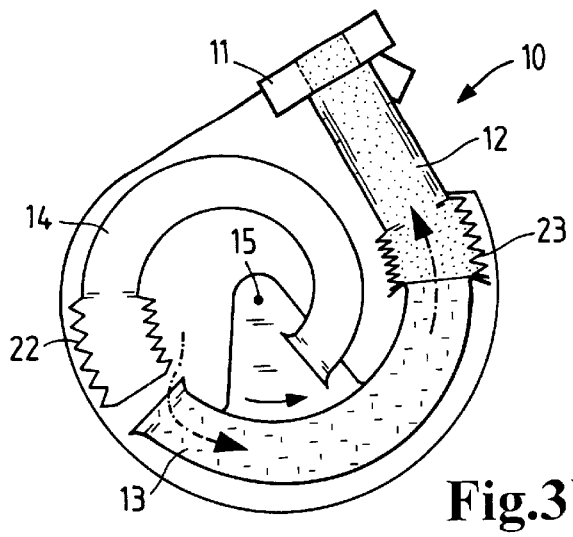
Figure 3C:
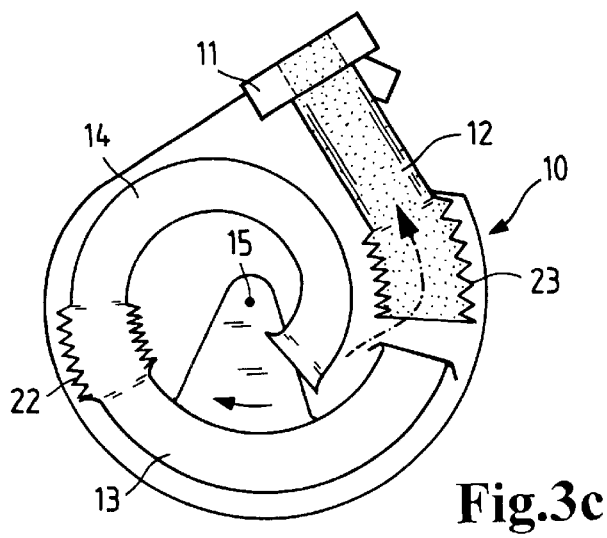

FIGS. 3a through 3c show another variant of the air intake device. Here the segment 14 is fixedly disposed in the housing 10. Flexible connection sections 22 and 23 are provided on segment 14 and on intake tube 12. The rotation of segment 13 produces a compression or stretching of these connection sections and thus, as can be seen in FIG. 3b, an opening between the segment 13 and segment 14 and, as shown in FIG. 3c, an opening between the intake tube 12 and segment 13.

Figure 4A:
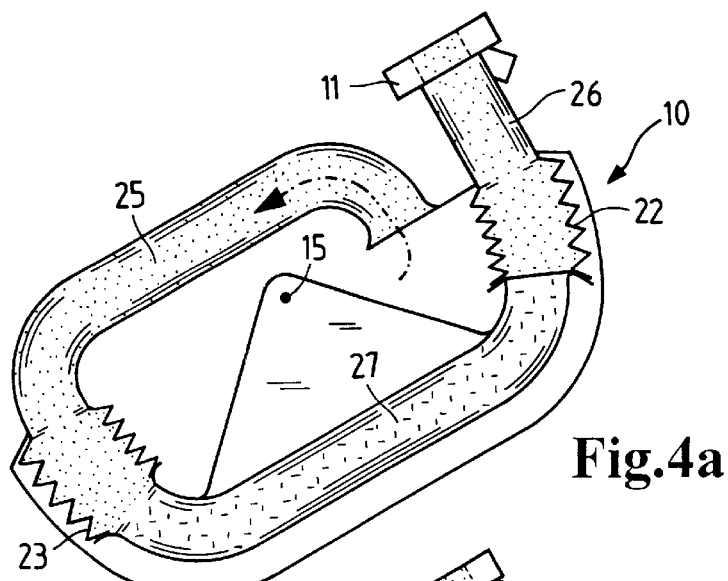
FIGS. 4a–c show an air intake device with a flat housing structure.
Figure 4B:
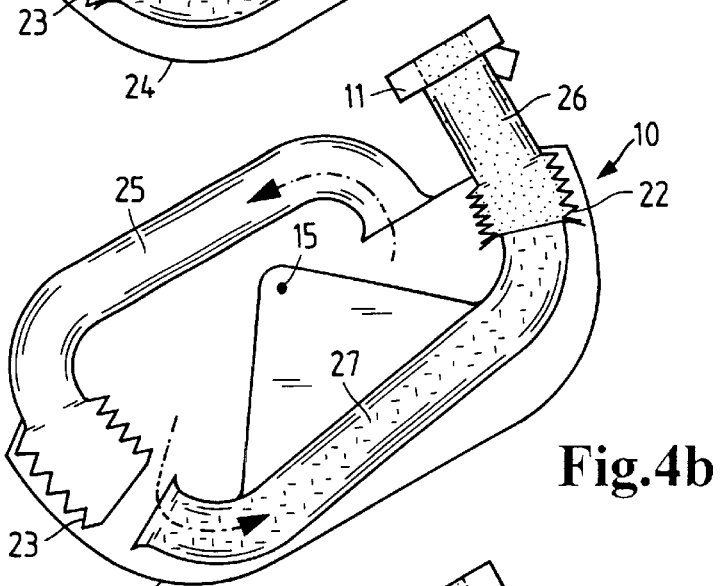
Figure 4C:
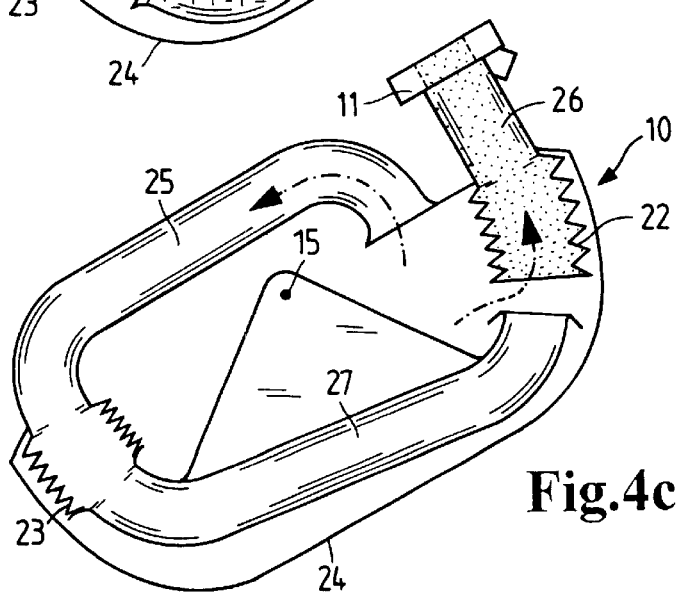

FIGS. 4a through 4c show an air intake device with a shallow housing structure. The housing 24 is provided with a segment 25 and an intake tube 26. A pivotable element 27 is journaled in the housing. A counter-clockwise rotation of the pivotable element 27 results in a compression of the intake area 22 and simultaneously in an opening between segment 25 and turning element 27. A clockwise rotation of this turning element 27 leads to a compression of the connection 23 and an opening of the intake tube 26. In this position the intake air flows directly into the short intake tube.

FIGS. 5a through 5c show an air intake device with a longitudinally displaceable intermediate element. The intermediate element 28 is moved in the direction of the arrow 30. In the position shown in FIG. 5a it connects the intake tube 31 to element 32. In FIG. 5b, the intermediate element 28 has shifted toward the intake tube 31 and element 32 is uncoupled. In the position shown in FIG. 5c the intermediate element is shifted in the opposite direction and opens the intake tube 31 to provide a short intake path.

FIGS. 6a through 6c show a detail of the intermediate element 28 similar to that described in FIG. 5 except that the compressible sections are mounted on the ends of the end tubes 35 and 36 instead of on the center segment 28. At its axial ends, the intermediate element carries connecting bells 33 and 34, which in the position shown in FIG. 6a accommodate the flexible ends of the two pipe sections 35 and 36. In the illustrated embodiment, the intermediate element 28 is fixedly disposed. This signifies that none of the pipe sections is movably mounted. Only the flexible ends of the two pipes 35 and 36 are longitudinally displaceable by means of pushers 37 and 38. FIG. 6b shows a movement of the pusher 37 to the right. This opens a passage 39 between tube 28 and tube 36. FIG. 6c shows a movement of the pusher 38 to the left. This opens the passage 40 between tube 28 and tube 35.

FIG. 7a shows shows an intake tube with an intermediate element 28 shifted to a leftward position. The seal between the intermediate element 28 and the pipe 41 is provided by a radial gasket 42 and a seal 44 biased by a compression spring 43. FIG. 7b shows the intermediate element 28 shifted to a rightward position. The seal between intermediate element 28 and the end tube is provided in the same way as on the opposite end by means of a compression spring 45, a seal 46 and a radial gasket 47. FIG. 7c shows the intermediate element 28 in a mid-position in which sealing is provided at both ends.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An air intake device for an internal combustion engine, said device comprising at least one collection manifold and a plurality of intake tubes which branch separately from the collection manifold to individual cylinders of the internal combustion engine, wherein each of the intake tubes extends to the collection manifold and is formed at least partially by an adjustable element, wherein said intake tubes each comprise a plurality of segments at least one of which is independently moveable relative to at least one other segment, wherein each intake tube comprises successive first, second and third elements which can be coupled together at coupling points, wherein the first element is a stiff element, the second element is a rotatable or longitudinally displaceable element, and the third element is a stiff element, and wherein the rotatable or longitudinally displaceable second element comprises variable-length portions at the coupling points.

2. An air intake device according to claim 1, wherein a plurality of moveable segments are journaled on a common pivot point.

3. An air intake device according to claim 1, wherein at least one segment is mounted so as to be longitudinally displaceable.

4. An air intake device according to claim 1, wherein the segments have coupling points which are provided with radial and/or axial seals.

5. An air intake device according to claim 1, wherein said first element is flanged to a cylinder head of the internal combustion engine.

6. An air intake device according to claim 1, wherein at least one of said segments comprises a variable length flexible portion.

7. An air intake device according to claim 1, wherein the intake tube comprises at least two independently moveable segments.

8. An air intake device for an internal combustion engine, said device comprising at least one collection manifold and a plurality of intake tubes which branch separately from the collection manifold to individual cylinders of the internal combustion engine, wherein each of the intake tubes extends to the collection manifold and is formed at least partially by an adjustable element, wherein said intake tubes each comprise a plurality of segments and wherein an intake tube comprises successive first, second and third fixed segments, and said first and third segments each have an independently compressible or extendible portion abutting the second segment.

9. An air intake device according to claim 8, wherein said first segment is flanged to a cylinder head of the internal combustion engine.

10. An air intake device according to claim 8, further comprising a first pusher coupled to said first segment and a second pusher coupled to said third segment.

\* \* \* \* \*